(12) United States Patent
Hara et al.

(10) Patent No.: US 7,927,687 B2
(45) Date of Patent: Apr. 19, 2011

(54) OPTICAL ELEMENT, OPTICAL LOWPASS FILTER, AND SOLID-STATE IMAGING DEVICE

(75) Inventors: Kazuhiro Hara, Suwa (JP); Takehiko Uehara, Minowa-machi (JP); Hiroyuki Mukaiyama, Minowa-machi (JP)

(73) Assignee: Epson Toyocom Corporation, Tokyo (JP)

( * ) Notice: Subject to any disclaimer, the term of this patent is extended or adjusted under 35 U.S.C. 154(b) by 411 days.

(21) Appl. No.: 12/046,148

(22) Filed: Mar. 11, 2008

(65) Prior Publication Data

US 2008/0226931 A1 Sep. 18, 2008

(30) Foreign Application Priority Data

Mar. 13, 2007 (JP) ................................. 2007-062952
Mar. 5, 2008 (JP) ................................. 2008-054443

(51) Int. Cl.
*B32B 3/00* (2006.01)
*B32B 23/02* (2006.01)
*B32B 17/06* (2006.01)

(52) U.S. Cl. ........ 428/189; 428/426; 428/192; 359/497; 359/498; 359/483

(58) Field of Classification Search .................. 428/189, 428/426, 192; 359/497, 498, 483, 885
See application file for complete search history.

(56) References Cited

U.S. PATENT DOCUMENTS 6,448,339 B1 9/2002 Tomita
2002/0149847 A1* 10/2002 Osawa et al. ................. 359/498

FOREIGN PATENT DOCUMENTS

| JP | A-10-310754 | 11/1998 |
|---|---|---|
| JP | A-2002-327160 | 11/2002 |
| JP | A-2004-61829 | 2/2004 |
| JP | A-2004-070340 | 3/2004 |
| JP | A-2004-258165 | 9/2004 |
| JP | A-2004-354973 | 12/2004 |
| JP | A-2005-23169 | 1/2005 |
| JP | A-2005-82775 | 3/2005 |
| JP | A-2006-259257 | 9/2006 |
| JP | A-2006-30915 I | 11/2006 |
| JP | A-2006-349736 | 12/2006 |
| JP | A-2007-102183 | 4/2007 |

* cited by examiner

*Primary Examiner* — Jennifer C McNeil
*Assistant Examiner* — Catherine Simone
(74) *Attorney, Agent, or Firm* — Oliff & Berridge, PLC

(57) ABSTRACT

To provide an optical element, an optical lowpass filter, and a solid-state imaging device of which quality and capability are hard to deteriorate even if they are continually subject to both of a high-temperature, high-humid environment and a normal environment. An optical lowpass filter includes a first birefringent plate, an IR-cut glass, a ¼ retardation film, a second birefringent plate, and a pressure sensitive adhesive as a bonding layer bonding these members. The pressure sensitive adhesive primarily contains a pressure sensitive adhesive main agent polymer composed of a monomer including many hydrophilic groups so as to enhance permeableness of water within the pressure sensitive adhesive. In addition, by selecting a mixing weight ratio of the pressure sensitive adhesive main agent polymer, the permeableness can be further enhanced. Therefore, such an optical element and an optical component can be obtained that are hard to become white turbid under the high-humidity environment by making the pressure sensitive adhesive thereof have efficient and saturated water; and that discharge water that is inside the pressure sensitive adhesive from the periphery thereof to the air so as to recover their optical properties in a short period of time under the normal environment.

14 Claims, 9 Drawing Sheets

| MIXING WEIGHT RATIO OF PRESSURE SENSITIVE ADHESIVE MAIN AGENT POLYMER (wt%) | AMOUNT OF WATER ABSORPTION (g) | | HAZE VALUE | | |
|---|---|---|---|---|---|
| | 40μm | 10μm | IMMEDI-ATELY AFTER | 5 MINUTES AFTER | 10 MINUTES AFTER |
| 60 | 0.01095 | 0.00258 | 0.04 | 0.04 | 0.04 |
| 55 | 0.00158 | 0.00035 | 12.48 | 8.61 | 0.37 |
| 50 | 0.00069 | 0.00022 | 15.44 | 10.42 | 0.05 |

OPTICAL ELEMENT, OPTICAL LOWPASS FILTER, AND SOLID-STATE IMAGING DEVICE

TECHNICAL FIELD

The present invention relates to an optical element, an optical lowpass filter, and a solid-state imaging device. In particular, the invention relates to an optical element in which a member constituting the optical element is bonded with a pressure sensitive adhesive.

BACKGROUND TECHNOLOGY

The optical element mentioned above is, for example, an optical lowpass filter (OLPF) and the like. This optical lowpass filter has a structure disclosed in Patent Document 1. In detail, an optical lowpass filter 110 is structured such that a retardation film 170 that is a type of transmitting optical films is sandwiched by two birefringent plates 150 and 180 that are a type of transmitting optical substrates and made of crystal, as shown in FIG. 11. Members (the birefringent plate 150, an IR-cut glass 160, the retardation film 170, and the birefringent plate 180) constituting the optical lowpass filter 110 are bonded with each other with adhesive layers 190. The optical lowpass filter 110 may have such structure that the IR-cut glass 160 is bonded as a unit. The optical lowpass filter 110 includes a sealant 200 at a peripheral border thereof. The sealant 200 may be formed in a contiguous manner from the end part of the bonding layers 190 or formed so as to cover whole end part of the optical lowpass filter 110.

Optical elements such as the optical lowpass filter 110 are required to have quality reliability in a high-temperature environment test, a low-temperature environment test, a temperature shock test in which a temperature is changed high and low repeatedly, a high-humidity environment test, and the like. Therefore, a pressure sensitive adhesive that is suitable for a temperature shock tends to be employed compared to an adhesive as the bonding layers 190 shown in FIG. 11. In particular, bonding the birefringent plates 150, 180 and the retardation film 170, employs a pressure sensitive adhesive so as to prevent the plates and the film from peeling off from each other due to a difference in their volume contractions caused by a temperature change. The pressure sensitive adhesive has a preferable viscosity function so as to be able to absorb the difference in the volume contractions. The sealant 200 is provided at the end part of the pressure sensitive adhesive or the periphery of the optical element in order to prevent water from permeating.

[Patent Document 1] Japanese Unexamined Patent Application Publication No. 2006-309151
[Patent Document 2] Japanese Unexamined Patent Application Publication No. 2004-258165

DISCLOSURE OF THE INVENTION

Problems to be Solved

However, though employing a pressure sensitive adhesive can solve a defect caused by the temperature change and enhance the reliability with respect to the temperature shock, the optical property was deteriorated as follows: the pressure sensitive adhesive absorbs water to become white turbid in the high-humidity environment test, and even though the optical element is returned to a normal environment (hereinafter, a low-humidity environment is referred to as a normal environment), the white turbid state remains for a long period of time. This has been a problem in commercialization of optical elements in which a pressure sensitive adhesive is used instead of a related art adhesive as the bonding layers 190.

It is commonly said that if no water permeates a pressure sensitive adhesive, the above problem can be solved. Therefore, the sealant 200 is commonly provided at a periphery of optical elements (Patent Document 1 and Patent Document 2). However, optical elements have not been improved to an extent completely preventing the white turbidity even with these methods. Namely, even though a sealing layer is provided at the periphery of an optical element, if the optical element is subjected to a high-humidity environment for a long period of time, water gradually passes through the sealing layer to permeate the pressure sensitive adhesive. Accordingly, the optical element becomes white turbid. When the optical element that has become white turbid is returned to the normal environment, the white turbidity especially at a central part of a substrate disadvantageously remains for a long period of time. Namely, the sealing layer at the periphery has an advantageous effect for an exposure to a high-humidity environment for a short period of time, but it does not work in a case of an exposure for a long period of time. Further, there has been such adverse effect that an optical element having a sealing layer at the periphery thereof takes more time to regain its transparency when it is returned to the normal environment.

In order to obtain a preferable viscosity that can absorb an expansion difference of members caused by a temperature change, a pressure sensitive adhesive having low cross-linking density is suitably employed. However, the pressure sensitive adhesive having a low cross-linking density cannot prevent permeation of water to become white turbid, deteriorating an optical quality. Further, if the pressure sensitive adhesive is subjected to the high-humidity environment for a long period of time, it becomes white turbid, and even though it is returned to the normal environment, it cannot recover in a short period of time. Therefore, such pressure sensitive adhesive that is hard to become white turbid by water or can recover in a short period of time even if it becomes white turbid, without increasing a cross-linking density, has been required for a commercialization of an optical element that can meet in the temperature shock and the high-humidity environment test.

The present invention is intended to provide an optical element, an optical lowpass filter, and a solid-state imaging device that are hard to deteriorate their quality and capability even though they are subjected to both of a high-humidity environment and a normal environment, that is, used in an outdoor environment, for example, or that recover in a short period of time even if they are once deteriorated.

Means to Solve the Problems

The present invention has been achieved to solve at least a part of the problems described above, and can be realized as the following aspects or application examples.

Application Example 1

An optical element, includes: a transmitting optical film; a transmitting optical substrate; and a pressure sensitive adhesive. In the optical element, the transmitting optical substrates are bonded to both surfaces of the transmitting optical film with the pressure sensitive adhesive. The optical element has an ambient air opening structure in which an end part of the pressure sensitive adhesive directly contacts an ambient air.

In the optical element, the pressure sensitive adhesive is made of a polymer primarily containing at least one monomer selected from acrylic acid alkoxyalkyl ester and methacrylic acid alkoxyalkyl ester.

According to this structure, by employing the pressure sensitive adhesive primarily containing the polymer described above, the pressure sensitive adhesive employed as a bonding layer enhances water permeation to the inside thereof under a high-humidity environment so as to absorb the water in a short period of time until reaching a saturated state. In related art pressure sensitive adhesive, water permeation to the inside of the pressure sensitive adhesive is insufficient, accordingly generating many water masses that are dispersed. At the surface of the water masses generated within the related art pressure sensitive adhesive, light scatter occurs, so that white turbidity easily occurs. Inside the pressure sensitive adhesive of the present invention, water easily permeates and disperses between molecules of the pressure sensitive adhesive and therefore a water mass is hard to be generated. Accordingly, it is considerable that water masses having a surface causing light scattering are generated in small amount so that white turbidity is hard to occur. In the pressure sensitive adhesive according to the present invention, improvement of permeation and dispersion of water compared to the related art can be confirmed from that a water absorption amount to the pressure sensitive adhesive until a saturated state is larger than that of the related art pressure sensitive adhesive.

When the pressure sensitive adhesive that has absorbed water until the saturated state is returned to the normal environment, the water of the pressure sensitive adhesive at the central part of the optical element easily moves to the end part. Thus the water sequentially moves to the end part to be discharged to outside air. Water permeation is insufficient in the related art pressure sensitive adhesive, so that the move of the water within the pressure sensitive adhesive is slow and accordingly it takes time to discharge the water from the end part to the outside air. Therefore, when the adhesive is returned to the normal environment, the optical property easily deteriorates due to the residual water. In the optical element employing the pressure sensitive adhesive according to the present invention, permeableness of the pressure sensitive adhesive is high and the element has an ambient air opening structure in which the end part is not sealed but is open to the outside air. Therefore, the water can be discharged to the outside air in a short period of time so as to recover from deterioration of the optical property.

Here, the transmitting optical film is a film through which light can be transmitted and does not limit a wavelength and a transmission of transmissible light. In addition, the transmitting optical substrate is a substrate through which light can be transmitted and does not limit a wavelength and a transmission of transmissible light.

Application Example 2

In the optical element according to this application example, at least one part of the end part of the pressure sensitive adhesive is protruded from a periphery of the transmitting optical substrate.

Since at least one part of the end part of the pressure sensitive adhesive is protruded, a larger superficial area contacting the outside air can be secured than related art, and the water can be more efficiently discharged from the end part to the outside air. Therefore, the water can be removed further more efficiently in a case where the optical element that has absorbed water until the saturated state in the high-humidity environment is moved to the normal environment, so that the optical element can recover from the deterioration of the optical property in a short period of time.

Application Example 3

An optical lowpass filter according to this application example includes the optical element of the above application example.

According to this structure, such optical lowpass filter can be obtained that even if it is left in the high-humidity environment for a long period of time, the white turbidity is hard to occur; and when it is returned to the normal environment, it can discharge water that is in the pressure sensitive adhesive included in the optical element in a short period of time and can suppress variation of retardation and the like without deteriorating information of the incident light (image information, for example).

Application Example 4

A solid-state imaging device according to this application example includes the optical element of the above application example.

According to this structure, such solid-state imaging device can be obtained that even if it is left in the high-humidity environment for a long period of time, the white turbidity is hard to occur; and when it is returned to the normal environment, it can discharge water that is in the pressure sensitive adhesive included in the optical element in a short period of time and can receive imaging information that is close to the regular state without deteriorating of incident image information.

Application Example 5

In the optical element according to this application example, at least one of the transmitting optical substrates is any one of crystal, lithium niobate, and calcite.

This structure is preferable to bond materials having different linear expansion coefficients from each other, as bonding an inorganic material such as a crystal substrate and an organic material such as the transmitting optical film. The pressure sensitive adhesive described above can absorb a difference between the volume contractions due to its preferable viscosity, and further, can recover from the deterioration of the optical property in a short period of time.

Application Example 6

In the optical element according to this application example, at least one of the transmitting optical substrates is any one of an optical glass and an IR absorption glass.

According to this structure, materials having different linear expansion coefficients from each other can be bonded. Therefore, an optical element to which the following functions are added can be obtained: even if it is left in the high-humidity environment for a long period of time, the white turbidity is hard to occur; the deterioration of the optical property due to the water can be cleared in a short period of time under the normal environment; and glasses having functions such as dust prevention and IR-cut can be layered.

Application Example 7

In the optical element according to this application example, the transmitting optical film is made of an organic polymer material.

According to this structure, such member can be obtained inexpensively that is provided with retardation property by uniaxial stretching and the like; bonded as a part of the lowpass filter described above, for example; and has a function converting linearly polarized light beams into circularly polarized light beams.

DESCRIPTION OF THE PREFERRED EMBODIMENTS

Embodiments of the present invention will now be described with reference to the accompanying drawings.

First Embodiment

FIG. 1 is a schematic sectional view showing a structure of an optical lowpass filter 11 as an optical element. Herein, the structure of the optical lowpass filter 11 will be described with reference to FIG. 1.

As shown in FIG. 1, the optical lowpass filter 11 is used, for example, in a digital still camera and a digital video camera so as to suppress a generation of a pseudo signal such as a moire. The optical lowpass filter 11 is interposed between a light receiving lens 13 for imaging a light 12 (an incident light) and a solid-state imaging element 14 converting an optical image that is formed into an electrical signal and capturing the electrical signal. The solid-state imaging element 14 is a CCD, a CMOS, or the like. The optical lowpass filter 11 disposed adjacent to such the solid-state imaging element 14 includes: a first birefringent plate 15 as a transmitting optical substrate; an IR-cut glass 16; a ¼ retardation film 17 as a transmitting optical film; a second birefringent plate 18 as a transmitting optical substrate; and a pressure sensitive adhesive 19 for bonding these members (the first birefringent plate 15, the IR-cut glass 16, the ¼ retardation film 17, and the second birefringent plate 18).

The first birefringent plate 15 is a crystal substrate having a rectangular shape and is disposed at the light receiving lens 13 side in the optical lowpass filter 11. The first birefringent plate 15 is used for separating the light 12 into two rays that are a normal ray and an abnormal ray. The first birefringent plate is obtained by cutting such that a normal of a main surface has a predetermined angle with respect to a crystal optical axis (Z axis) of a crystal so as to obtain a desired separation width.

The IR-cut glass 16 is interposed between the first birefringent plate 15 and the ¼ retardation film 17 and used for cutting infrared ray component.

The ¼ retardation film 17 is interposed between the IR-cut glass 16 and the second birefringent plate 18. The ¼ retardation film 17 is formed by uniaxial stretching and is made of a resin material composed of an organic high-polymer material. The resin material employed here is polycarbonate based resin, for example. The polycarbonate resin has high heat-resistance, low water absorption rate, high durability, and excellent transparency. Further, mixed with a compound having an optical anisotropy, the polycarbonate resin can be provided with such wavelength dispersion property that a phase contrast increases as a wavelength of the light 12 that enters increases, and can be a high-performance ¼ wavelength plate.

The ¼ retardation film 17 can be used as a ¼ wavelength plate by adequately setting a film thickness in accordance with birefringence (refractive index anisotropy) of the resin material. That is, the ¼ retardation film 17 can convert a polarization state of the light 12 that is separated into two rays from linearly polarized rays into circularly polarized rays.

The second birefringent plate 18 is a rectangular crystal plate as the first birefringent plate 15, and is disposed at the solid-state imaging element 14 side of the optical lowpass filter 11. The second birefringent plate 18 is employed for further separating two rays that are converted into the circularly polarized rays at the ¼ retardation film 17 into four linearly polarized rays (four-point separation). The second birefringent plate 18 is obtained by cutting such that a normal of a main surface has a predetermined angle with respect to a crystal optical axis (Z axis) of a crystal so as to obtain a desired separation width, as is the case with the birefringent plate 15.

Examples of a material having birefringence and used for the first birefringent plate 15 and the second refringent plate 18 includes: lithium niobate, Chile saltpeter, calcite, rutile, KDP($KH_2PO_4$), and ADP($NH_4H_2PO_4$) as well as a crystal substrate. Among these, crystal, lithium niobate, and calcite are preferably used from the point of strength and cost. If an optical lowpass filter of four point type is not used, a glass material may be used as the light transmitting optical substrate.

On a surface at a light receiving lens 13 side of the first birefringent plate 15 and on a surface at a solid-state imaging element 14 side of the second birefringent plate 18, an anti-reflection film (AR film), and an ultraviolet radiation cut film and an infra-red radiation cut film (UV-IR cut film) (they are not shown) may be provided. The AR film improves the transmitting rate of visible light. The UV-IR cut film prevent the ultraviolet ray and the infrared ray from entering the solid-state imaging element 14.

The optical lowpass filter 11 including the pressure sensitive adhesive 19 is required to maintain its primary capability in various environmental changes. Therefore, the optical lowpass filter 11 needs to pass various environmental reliability tests. In particular, the high-temperature environment test is conducted at 85° C., the low-temperature environment test is conducted at −40° C., the temperature shock test is conducted such that the temperature is repeatedly changed between −40° C. and 85° C., and the high-temperature high-humidity environment test is conducted at 90% and 60° C. Especially, the pressure sensitive adhesive 19 is required to maintain a preferable viscosity, to be hard to become white turbid under the high-temperature high-humidity environment, and to recover from deteriorated optical property in a short period of time when the environment is changed from the high-temperature high-humidity environment to the normal environment.

The pressure sensitive adhesive 19 is a pressure sensitive adhesive composition obtained by curing a pressure sensitive adhesive main agent polymer by a cross-linking agent. The pressure sensitive adhesive main agent polymer mainly contains acrylic acid alkoxyalkyl ester or methacrylic acid alkoxyalkyl ester each of which has high hydrophilicity. Further, a low molecular weight polymer and the like can be blended so as to enhance an adhesion with respect to an adhesion object and prevent lifting in the durability test. The low molecular weight polymer is obtained by copolymerizing a monomer containing an amino group or an amide group.

The pressure sensitive adhesive main agent polymer is obtained by copolymerizing a monomer containing a carboxyl group with one or more monomer selected from acrylic acid alkoxyalkyl ester and methacrylic acid alkoxyalkyl ester that are the principal constituent of the polymer. A copolymer in which an after-mentioned monomer capable of being copolymerized is added is also available.

Examples of acrylic acid alkoxyalkyl ester or methacrylic acid alkoxyalkyl ester being the principal constituent include: acrylic acid 2-methoxyethyl, acrylic acid 2-methoxypropyl, acrylic acid 2-methoxybutyl, acrylic acid 2-ethoxyethyl, acrylic acid 3-ethoxypropyl, methacrylic acid 2-methoxyethyl, methacrylic acid 2-methoxypropyl, methacrylic acid 2-methoxybutyl, methacrylic acid 2-ethoxyethyl, methacrylic acid 3-ethoxypropyl, and methacrylic acid 4-ethoxybutyl.

Examples of the monomer containing a carboxyl group and to be copolymerized with the above-mentioned monomer include: acrylic acid, methacrylic acid, maleic acid, and fumaric acid.

Examples of the monomer capable of being copolymerized include: acrylic acid alkyl ester, methacrylic acid alkyl ester, acrylic acid aryl ester, methacrylic acid aryl ester, and a monomer containing a hydroxyl group such as acrylic acid 2-hydroxyethyl, and a monomer containing an epoxy group such as allyl glycidyl ether.

If a mixing ratio of acrylic acid alkoxyalkyl ester or methacrylic acid alkoxyalkyl ester monomer each of which is the principal constituent is too low, white turbidity easily occurs under the high-temperature high-humidity environment. Therefore, the mixing weight ratio is set to be from 60% to 100% inclusive.

Further, if the molecular weight of the pressure sensitive adhesive main agent polymer obtained by the copolymerization is too low, the durability is insufficient under the high-temperature high-humidity environment. Therefore, the weight-average molecular weight is preferably 600,000 or more.

As the cross-linking agent, common materials such as isocyanate, epoxy compound, metallic chelate can be employed. An appropriate blending quantity of the cross-linking agent changes depending on a cross-linking agent to be used. However, if the adding amount of the cross-linking agent is more than necessity, the turbidity easily occurs under the high-temperature high-humidity environment and the adhesive force with respect to an adhesion object decreases. If the adding amount is less than necessity, the cohesive force of the pressure sensitive adhesive 19 is insufficient, obstructing the durability.

The low molecular weight polymer that is added as needed so as to enhance the adhesion with respect to the adhesion object is a polymer obtained by copolymerizing a monomer including an amino group or a monomer including an amide group with a monomer such as methacrylic acid alkyl ester and methacrylic acid cycloalkyl ester that are the principal constituent. An example of the monomer including an amino group includes acrylic acid amino ethyl and methacrylic acid amino ethyl. An example of the monomer including an amide group includes acrylic amide and methacrylic amide. The weight-average molecular weight of the low molecular weight polymer is preferably 50,000 or less. If it is more than 50,000, the compatibility with the pressure sensitive adhesive main agent polymer easily deteriorates.

Further, decrease of the adhesive force of the pressure sensitive adhesive 19 caused by high hydrophilicity (hydrophilic group) can be sustained by copolymerizing the low molecular weight monomer.

FIG. 2 is a table showing a relation between a mixing weight ratio of the pressure sensitive adhesive main agent polymer and an amount of water absorption, and a relation between a mixing weight ratio of the pressure sensitive adhesive main agent polymer and a HAZE value (cloudiness degree), in a pressure sensitive adhesive. FIG. 3 is a graph showing a relation between a mixing weight ratio of the pressure sensitive adhesive main agent polymer and an amount of water absorption in two kinds of the thickness of the pressure sensitive adhesive. FIG. 4 is a graph showing a relation between elapsed time after changing from a high-humidity environment to a normal environment (low-humidity environment) and a HAZE value in each of mixing weight ratios of the pressure sensitive adhesive main agent polymer. Hereinafter, the relation between the mixing weight ratio of the pressure sensitive adhesive main agent polymer and the amount of water absorption, and the relation between the mixing weight ratio of the pressure sensitive adhesive main agent polymer and a HAZE value will be described.

Here, the HAZE value was measured by using a single beam type haze computer HZ-1 produced by Suga Test Instruments Co., Ltd. In terms of the amount of water absorption, a pressure sensitive adhesive was sandwiched between two glass substrates (50 mm×50 mm) and then weight variation of the glass substrates were measured before and after they were left in an environment at 60° C. and 90% for 1,000 hours. Then the amount of water absorption per a unit area was calculated.

Referring to FIG. 2, a measuring condition for obtaining the properties mentioned above will be described. A sample used for the measurement is structured such that the pressure sensitive adhesive 19 is sandwiched between polycarbonate films of 10 cm×10 cm (thickness of 80 μm, for example). The thickness of the pressure sensitive adhesive 19 was set to be two kinds: 40 μm and 10 μm.

The mixing weight ratio of the pressure sensitive adhesive main agent polymer is a ratio of a weight of the pressure sensitive adhesive main agent polymer with respect to a weight of the pressure sensitive adhesive 19. The table of FIG. 2 shows properties in cases of the mixing weight ratio of the pressure sensitive adhesive main agent polymer of 50%, 55%, and 60%.

The high-humidity environment is an environment in which a sample is retained at a temperature of 60° C. and humidity of 90% for 1,000 hours, for example.

An amount of water absorption (g) is an amount of water that is absorbed by the pressure sensitive adhesive 19 in the high-humidity environment mentioned above.

The HAZE value is a cloudiness degree (white turbidity level). As the value decreases, the transparency increases. Here, HAZE values are measured immediately after, 5 minutes after, and 10 minutes after transferring the sample that has been retained in the high-humidity environment for 1,000 hours to the normal environment.

FIG. 3 is a graph showing the relation between a mixing weight ratio of the pressure sensitive adhesive main agent polymer and an amount of water absorption. The horizontal axis shows the mixing weight ratio (wt %) of the pressure sensitive adhesive main agent polymer and the vertical axis shows the amount of water absorption (g). A solid line A in FIG. 3 shows a characteristic of the pressure sensitive adhesive 19 having a thickness of 40 cm. A solid line B shows a characteristic of the pressure sensitive adhesive 19 having a thickness of 10 μm. Here, acrylic acid alkoxyalkyl ester was used as the pressure sensitive adhesive main agent polymer in the experiment (same in examples described later).

The graph in FIG. 3 shows that the amount of water absorption increases sharply at the mixing weight ratio of the pressure sensitive adhesive main agent polymer from about 55% to about 60%. The two kinds of pressure sensitive adhesive 19 (the solid lines A and B) have the same tendencies.

FIG. 4 is a graph showing the relation between elapsed time (minute) after changing from a high-humidity environment to a normal environment and the HAZE value. The horizontal axis shows the elapsed time (minute) and the vertical axis shows the HAZE value. Solid lines C to L of FIG. 4 show characteristics in a case changing the mixing weight ratio of the pressure sensitive adhesive main agent polymer from 45% to 68% at a predetermined interval.

The graph of FIG. 4 shows that the HAZE value becomes approximately 0 from immediately after changing from the high-humidity environment to the normal environment, at the mixing weight ratio of the pressure sensitive adhesive main agent polymer in a range from 60% to 68%. In detail, as shown in the table of FIG. 2, by setting the mixing weight ratio of the pressure sensitive adhesive main agent polymer to be 60%, a value of 0.4 that can be judged as a high transparency is shown from immediately after the environment is changed.

As described above, by setting the mixing weight ratio of the pressure sensitive adhesive main agent polymer constituting the pressure sensitive adhesive 19 to be in a range from 60% to 100%, the pressure sensitive adhesive 19 can be permitted to have more hydrophilic groups, improving the hydrophilicity. Even if the pressure sensitive adhesive 19 contains large amount of water under the high-humidity environment as shown in FIG. 3, it can maintain high transparency from immediately after the change into the normal environment as shown in FIG. 4. Further, since the cross-linking density is not high, the viscoelastic function can be prevented from deteriorating. Accordingly, when this pressure sensitive adhesive 19 is employed and the environment is changed, the pressure sensitive adhesive 19 does not peel off. Therefore, imaging information (light) to be received by the solid-state imaging element 14 can be received without deterioration thereof. It has taken for from 10 to 20 minutes to change from a white turbid state (a clouded state) to a highly transparent state in related art, but the state can be changed to an almost transparent state immediately after the environment is changed.

Further, the pressure sensitive adhesive 19 is composed of the above-mentioned components so as to have many hydrophilic groups, improving the hydrophilicity thereof. Accordingly, water can permeate the pressure sensitive adhesive 19 very easily such that the steam permeability, showing a permeating ratio of water, that has been about 350 through 400 $(g/m^2 \ 24 \ hors)$ in related art becomes about 550 $(g/m^2 \ 24 \ hors)$.

As described in detail above, according to the optical lowpass filter 11 of the first embodiment, the following advantageous effects can be obtained.

(1) According to the first embodiment, the pressure sensitive adhesive 19 that is primarily composed of the pressure sensitive adhesive principal agent including many hydrophilic groups mentioned above, so that the hydrophilicity inside the pressure sensitive adhesive 19 can be improved. Accordingly, the permeation and the dispersion of water are promoted, being able to allow the pressure sensitive adhesive 19 to blend with water. Therefore, when water enters the pressure sensitive adhesive 19, the water easily permeates and disperses. Thus the water can be permitted to permeate and disperse at an extent not scattering light. Further, since the mixing weight ratio of the pressure sensitive adhesive main agent polymer is selected at the rate described above, the adhesive force of the pressure sensitive adhesive 19 can be secured without making the density of the cross-linking that links molecules too high. Accordingly, even in a state that water easily enters, the water permeates and disperses, so that the pressure sensitive adhesive 19 is hard to become white turbid (hard to be clouded). As a result, the optical lowpass filter 11 that can suppress the generation of pseudo signals such as a moire without deteriorating the incident light (for example, imaging information and the like) can be provided because the pressure sensitive adhesive 19 included in the optical lowpass filter 11 is suppressed to become white turbid even if the environment changes.

Further, a pressure sensitive adhesive in which water permeates very easily is employed and the structure in which the end part of the pressure sensitive adhesive is permitted to contact the air directly is employed, being able to further shorten the discharge of the water. Advantageous effects of the structure of the end part of the pressure sensitive adhesive and the water discharge will be described later.

Second Embodiment

FIG. 5 is a schematic sectional view showing a structure of a solid-state imaging device of a second embodiment. Herein, the structure of the solid-state imaging device will be described with reference to FIG. 5. The difference is that the solid-state imaging device of the second embodiment employs the optical lowpass filter of the first embodiment described above as a cover thereof. Hereinafter, members same as those in the first embodiment have the same reference numerals and their descriptions will be omitted or simplified.

This solid-state imaging device 21 shown in FIG. 5 is provided to a digital still camera, a digital video camera, or the like, for example, and includes the solid-state imaging element 14, a package 22, and a cover 23.

The solid-state imaging element 14 is, for example, a CCD, a CMOS, or the like as described above, and is sealed (at a bottom part) in the package 22. The solid-state imaging element 14 includes a plurality of pixels that are arranged regularly at a predetermined pitch.

The package 22 is used for storing the solid-state imaging element 14 and formed in a concave shape having an opening at a light receiving lens side (not shown). The package 22 is provided with an external connecting wire (not shown) in a manner penetrating a side wall thereof, for example, so as to electrically couple the inside and the outside of the package 22. The solid-state imaging element 14 is electrically coupled with the external connecting wire through a bonding wire which is not shown.

The cover 23 is used for preventing an attach of dust or the like to the solid-state imaging element 14, and closes the package 22 in a manner covering the opening of the package 22. The cover 23 has a function of the optical lowpass filter 11 as described above, and includes the first birefringent plate 15, the IR-cut glass 16, the ¼ retardation film 17, the second birefringent plate 18, and the pressure sensitive adhesive 19 that bonds these members (the first birefringent plate 15, the IR-cut glass 16, the ¼ retardation film 17, and the second birefringent plate 18), as is the case with the first embodiment. Here, the structure, the component, and the like of the pressure sensitive adhesive 19 are same as those of the first embodiment.

As described above, according to the solid-state imaging device 21 of the second embodiment, the following advantageous effect can be obtained as well as the aforementioned advantageous effect (1) of the first embodiment.

(2) According to the second embodiment, the pressure sensitive adhesive 19 included in the cover 23 of the solid-state imaging device 21 is hard to become white turbid, and it recovers in a short period of time even if it becomes white turbid. Therefore, such solid-state imaging device 21 can be provided that can receive the light 12 being almost in a regular state without deteriorating the light 12 (imaging information, for example) that enters even if the environment changes.

Third Embodiment

FIG. 6 is a schematic sectional view showing a structure of an optical lowpass filter having a pressure sensitive adhesive of which an end part is convex. Hereinafter, the structure of the optical lowpass filter of the third embodiment will be described with reference to FIG. 6. Hereinafter, members same as those in the first embodiment have the same reference numerals and their descriptions will be omitted or simplified.

The difference between an optical element shown in FIG. 6 and the optical element shown in FIG. 1 is the shape of the end part of the pressure sensitive adhesive 19. The end part of the pressure sensitive adhesive 19 shown in FIG. 6 is protruded from the periphery of an optical element in an eave shape. Here, the protruding part may be along the periphery of a translucent member. That is, as long as the end part of the pressure sensitive adhesive 19 has a large area contacting the air, all kinds of shapes are available. Here, FIG. 6 is drawn regardless of the dimensional ratio and the eave of the end part is emphasized to have different dimension from that of the actual shape. That is, any end part is available as long as the end part is protruded about from 0.1 mm to 1 mm or more from the periphery of the adjacent translucent member. Further, all of the end parts of the pressure sensitive adhesive do not have to be protruded, and it is enough that a part of the end parts is protruded as described above.

In terms of the shape of the end part of the pressure sensitive adhesive in related art, a sealing layer is provided as shown in FIG. 11. The pressure sensitive adhesive was formed with the pressure sensitive adhesive of the present application to have three patterns of end part so as to evaluate change in retardation with time. The retardation was measured by KOBRA-21ADH produced by Oji Scientific Instruments. The size of the specimen was 20 mm×30 mm, and the measurement position was the center of an optical surface of the optical lowpass filter. The pressure sensitive adhesive containing the pressure sensitive adhesive main agent polymer of 60% and having a thickness of 10 µm was employed. Two optical glasses (BK7) and one retardation film are bonded with the pressure sensitive adhesive so as to form a specimen. The end part of the pressure sensitive adhesive was formed in three standards: a standard with a sealing layer; a standard with no sealing layer; and a standard with no sealing layer and with an end face in an eave shape. The pressure sensitive adhesive containing the pressure sensitive adhesive main agent polymer of 60% is hard to become white turbid in itself, but oversaturated water deteriorates the retardation.

FIG. 7 shows a change in increase of water with time in a high-humidity environment. S dashed line shows a sample having a sealing layer and R bold line shows a sample having no sealing layer. A condition of the high-humidity environment was set to be 60° C. 90% RH. The sealing layer that is formed at the end part of the pressure sensitive adhesive prevents the permeation of water in a case of being left in a short period of time. While, in a case of an elapsed time of close to 500 hours, the water permeates until water saturation occurs even though the sealing layer is provided. That is, the sealing layer does not work in a case leaving in the high-humidity environment for a long period of time.

FIG. 8 shows a change in an amount of water with time when a sample that has been left in a high-humidity environment for 500 hours until the sample is saturated with water is left in the normal environment. Namely, an evaluation how much water can be discharged to the air under the normal environment was conducted. A condition of the normal environment was set to be 25° C. 20% RH. S bold line shows a sample having no sealing layer, R dashed line shows a sample having a sealing layer, and P dotted line shows a sample having the pressure sensitive adhesive of which an end part has a protruded shape. It is shown that, in a case of the sample having a sealing layer, the speed discharging water in the normal environment is slow. In a case of the sample having no sealing layer and having the pressure sensitive adhesive of which the end part has a protruded shape, the speed discharging water is higher. It is considerable that this is because the superficial area, contacting the outside air, of the end part of the pressure sensitive adhesive increased.

FIG. 9 is a graph showing a relation between elapsed time after moving from the high-humidity environment to the normal environment and a retardation value, depending on a mixing weight ratio of the pressure sensitive adhesive main agent polymer. Retardation (retardation value) in initial stage that is before putting in the high-humidity environment was 147 nm. The end part of the pressure sensitive adhesive was convex. Conditions of the high-humidity environment were 60° C. 90% RH, and the leaving time of 500 hours, and conditions of the normal environment were 25° C. 20% RH. The retardation recovered in a short period of time in the pressure sensitive adhesive having the mixing weight ratio of the pressure sensitive adhesive main agent polymer. From the result of this graph, it is understood that only I dashed line of the mixing weight ratio of 60% and K bold line of 65% recover an initial retardation. Therefore, the mixing weight ratio of 60% or more of the pressure sensitive adhesive main agent polymer is preferable for the recovery of the retardation under the normal environment.

FIG. 10 is a graph showing a relation between elapsed time after moving from the high-humidity environment to the normal environment and a retardation value, depending on a shape of an end part of the pressure sensitive adhesive and a presence of a sealing layer. Retardation (retardation value) in initial stage that is before putting in the high-humidity environment was 147 nm. Conditions of the high-humidity environment were 60° C. 90% RH, and the leaving time of 500 hours, and conditions of the normal environment were 25° C. 20% RH. Here, a sample had the pressure sensitive adhesive containing a pressure sensitive adhesive main agent polymer at the mixing weight ratio of 60% was employed. S bold line shows a sample having no sealing layer, R dashed line shows a sample having a sealing layer, and P dotted line shows a sample having the pressure sensitive adhesive of which an end part has a convex shape. It is shown that, in a case of the sample having the sealing layer, the recovery of the retardation requires long period of time under the normal environment. In a case of the sample having no sealing layer and having the pressure sensitive adhesive of which the end part has a convex shape, the speed of the recovery of the retardation is higher.

Consequently, if a pressure sensitive adhesive containing the pressure sensitive adhesive main agent polymer at the mixing weight ratio of 60% or more is employed and the end part of the pressure sensitive adhesive is formed in a shape easily discharging water, an optical element that is returned to the normal environment can recover from deterioration of an optical property due to an affect of water, in a short period of time.

Note that the invention is not limited to the above embodiments, but can be applied as follows.

(Modification 1) As described above, while the optical lowpass filter and the solid-state imaging device are exemplified as a device employing the pressure sensitive adhesive 19, it is not limited to them. For example, the pressure sensitive adhesive 19 can be applied to an optical head device, a liquid crystal display, and a copy machine.

The entire disclosure of Japanese Patent Application Nos. 2007-062952, filed Mar. 13, 2007 and 2008-054443, filed Mar. 5, 2008 are expressly incorporated by reference herein.

EXPLANATION OF REFERENCE

Figures 1, 2:
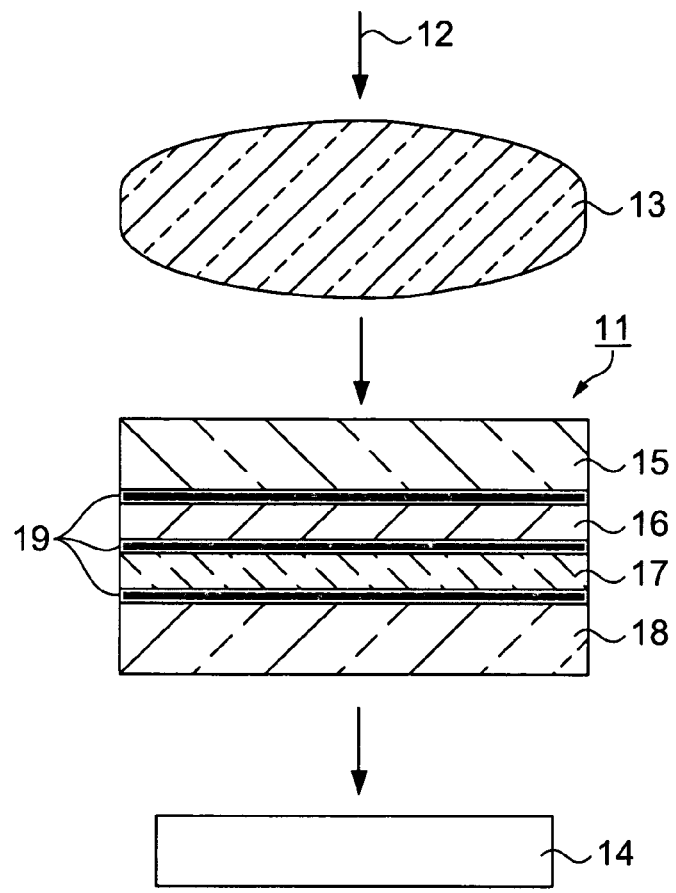
FIG. 1 is a schematic sectional view showing a structure of an optical lowpass filter according to a first embodiment.
FIG. 2 is a table showing a relation between a mixing weight ratio of the pressure sensitive adhesive main agent polymer and an amount of water absorption, and a relation between the mixing weight ratio of the pressure sensitive adhesive main agent polymer and a HAZE value.
Figure 3:
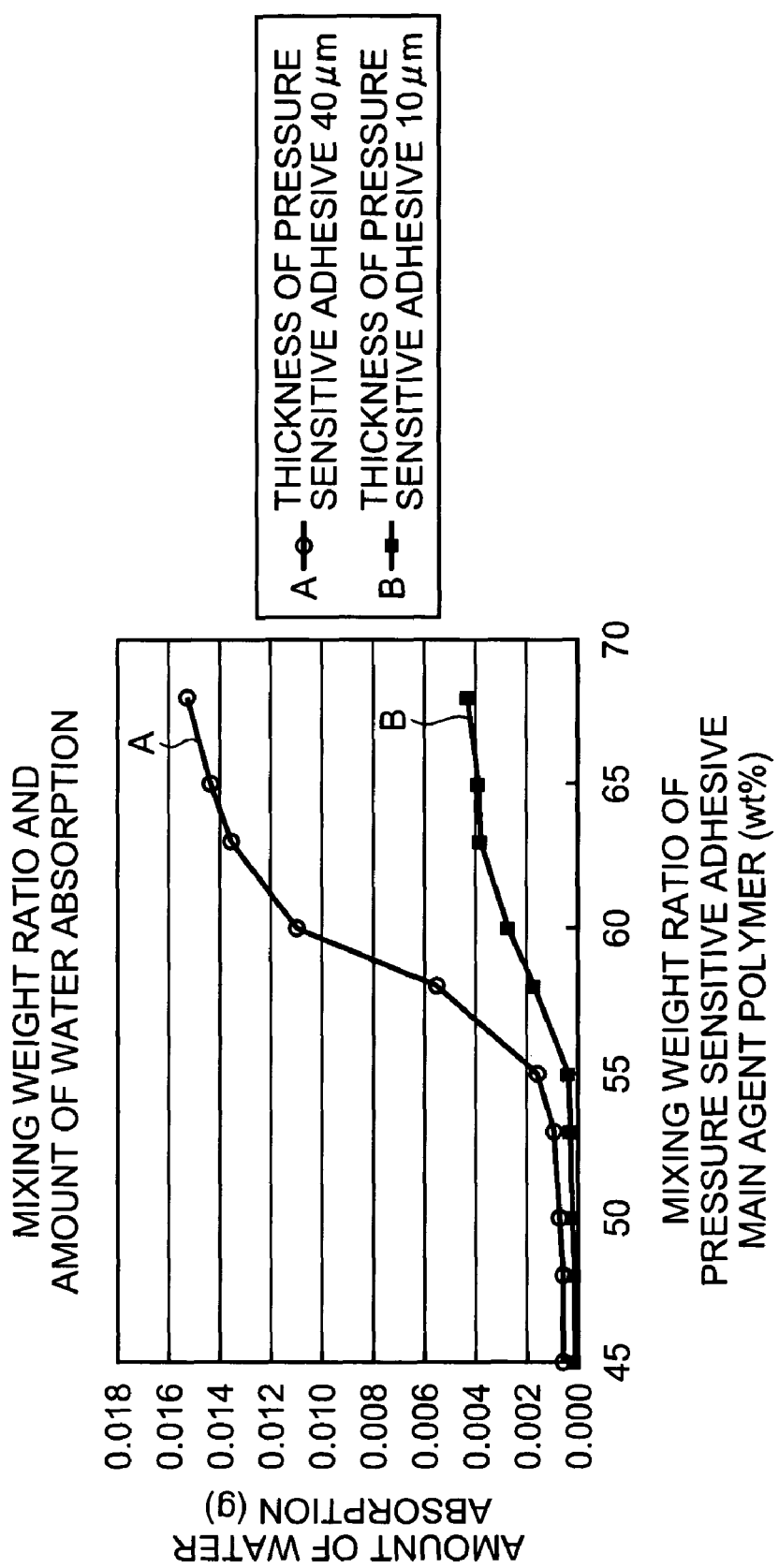
FIG. 3 is a graph showing a relation between a mixing weight ratio of the pressure sensitive adhesive main agent polymer and an amount of water absorption.
Figure 4:
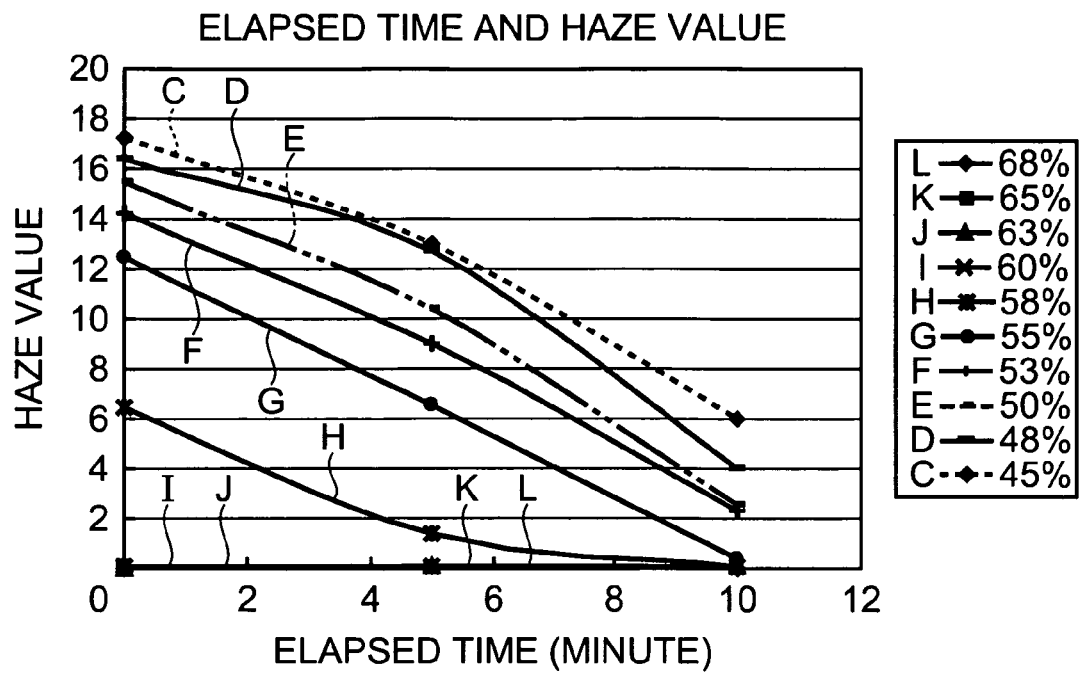
FIG. 4 is a graph showing a relation between elapsed time after moving from the high-humidity environment to the normal environment and a HAZE value.
Figure 5:
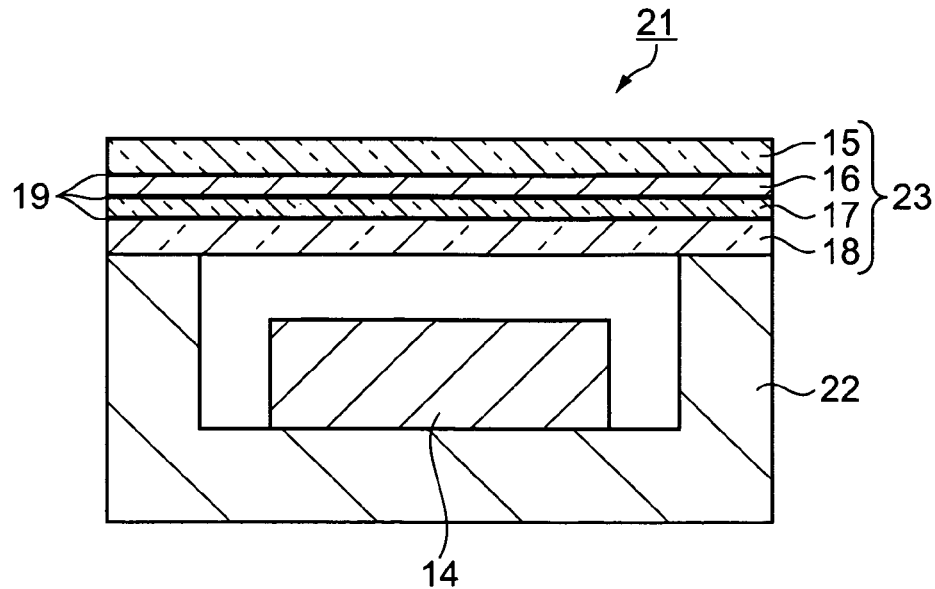
FIG. 5 is a schematic sectional view showing a structure of a solid-state imaging device of a second embodiment.
Figure 6:
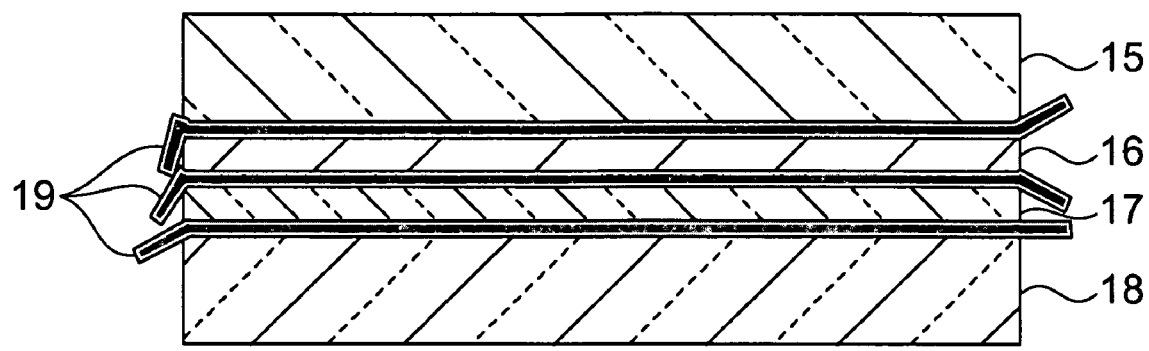
FIG. 6 is a schematic sectional view showing a structure of an optical lowpass filter according to a third embodiment.
Figure 7:
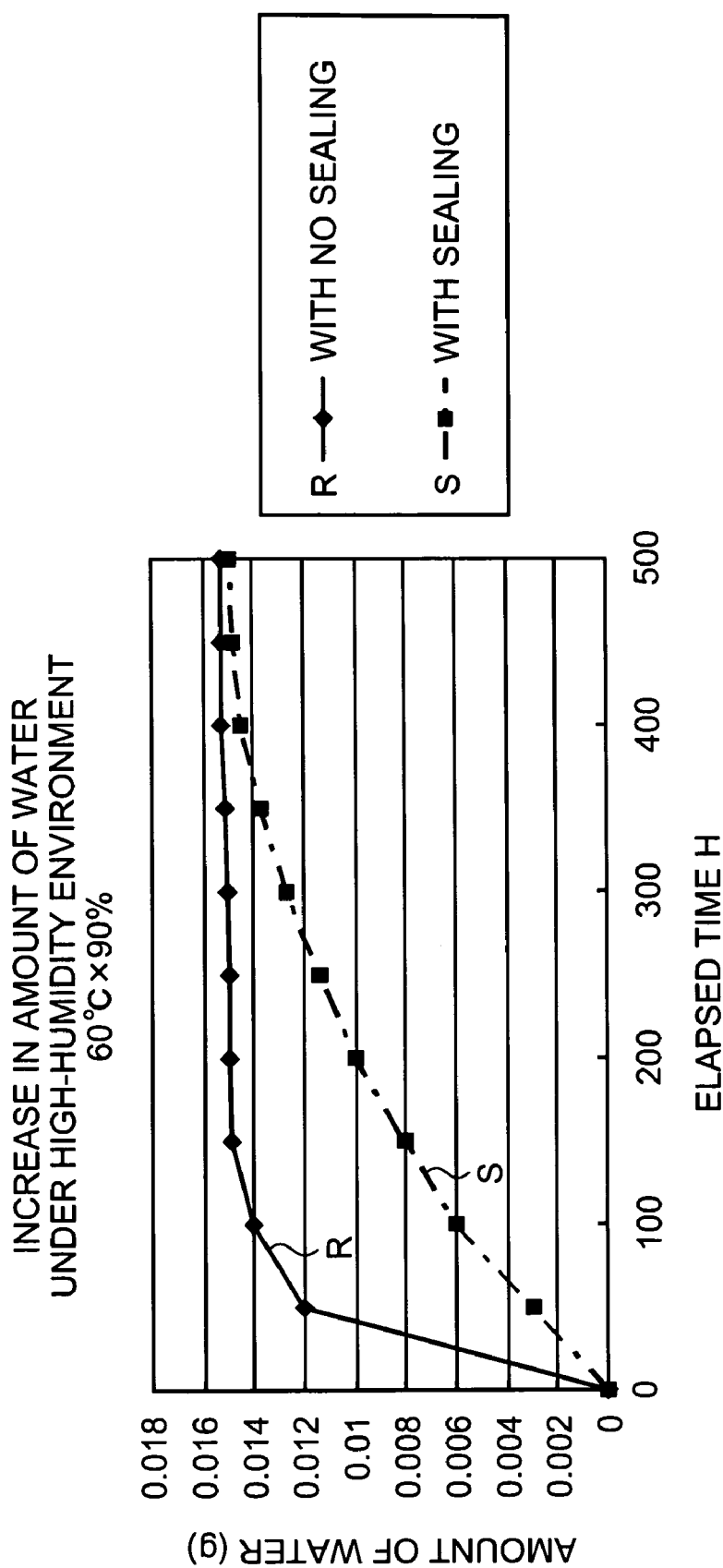
FIG. 7 is a graph showing a relation between a presence of sealing at an end part of the pressure sensitive adhesive and an amount of water.
Figure 8:
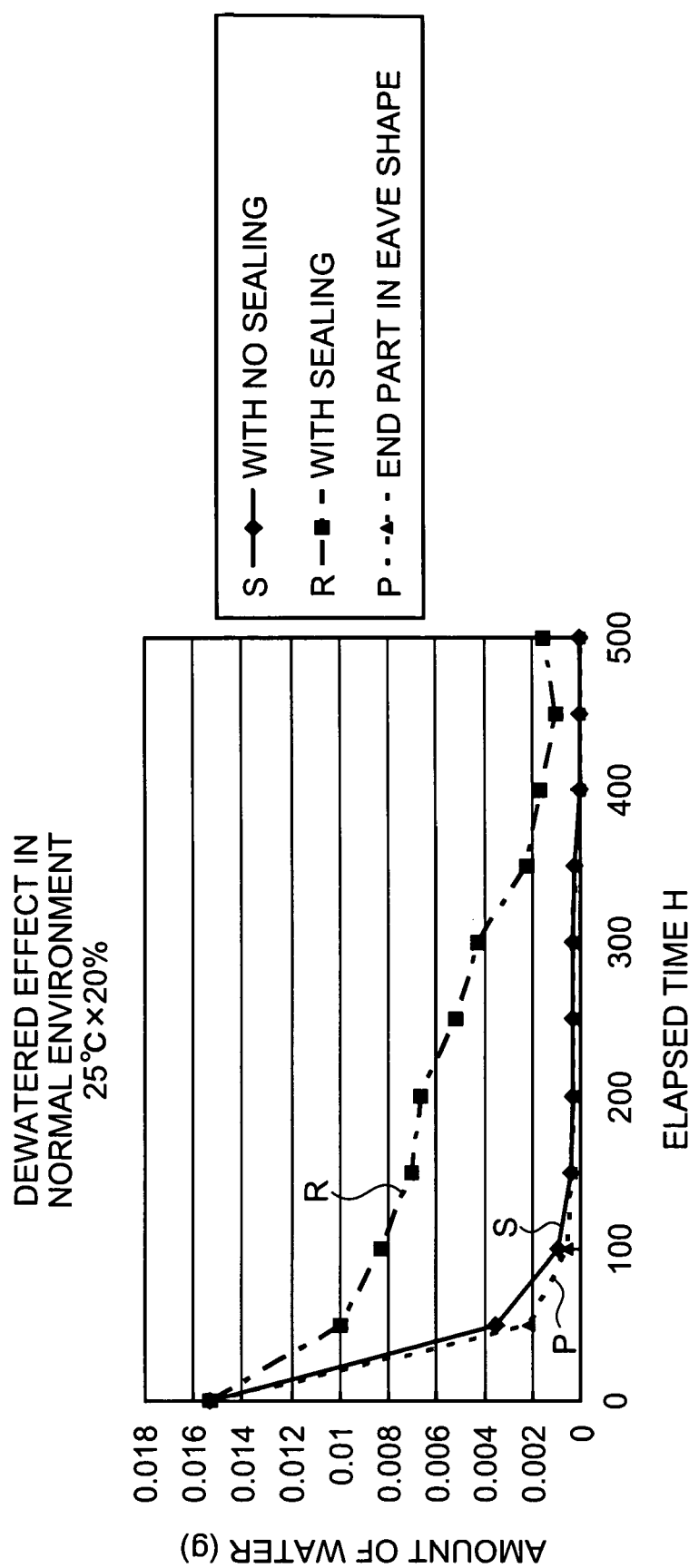
FIG. 8 is a graph showing a relation between elapsed time after moving from the high-humidity environment to the normal environment and a dewatered amount, depending on a difference in shapes of the end part of the pressure sensitive adhesive.
Figure 9:
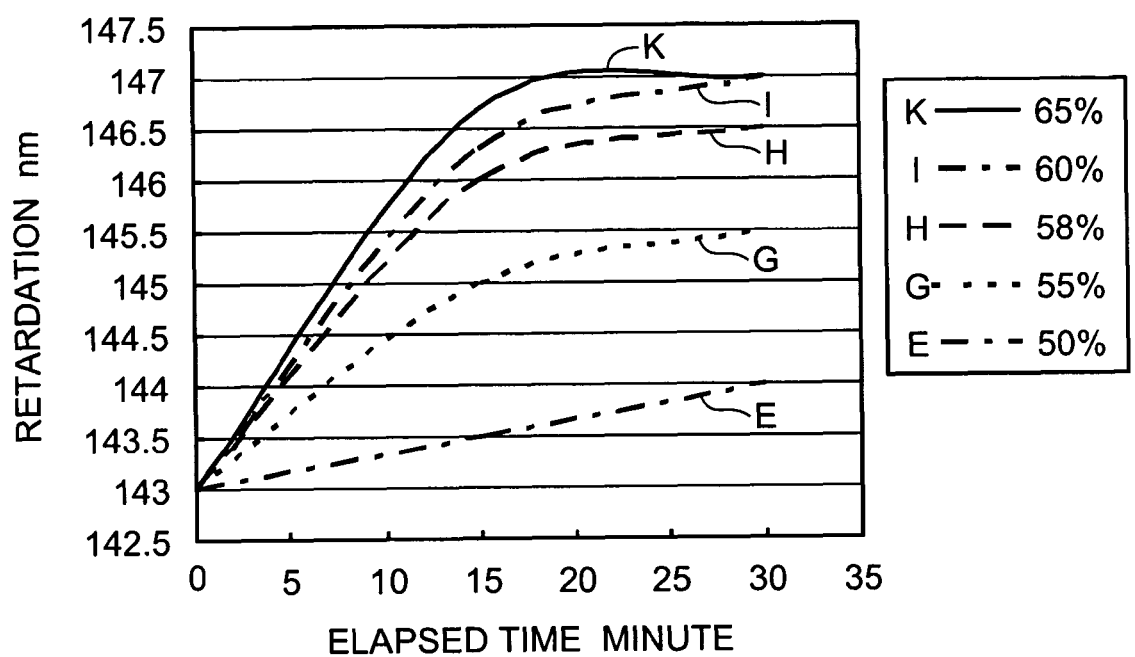
FIG. 9 is a graph showing a relation between elapsed time after moving from the high-humidity environment to the normal environment and a retardation value, depending on a mixing weight ratio of the pressure sensitive adhesive main agent polymer.
Figure 10:
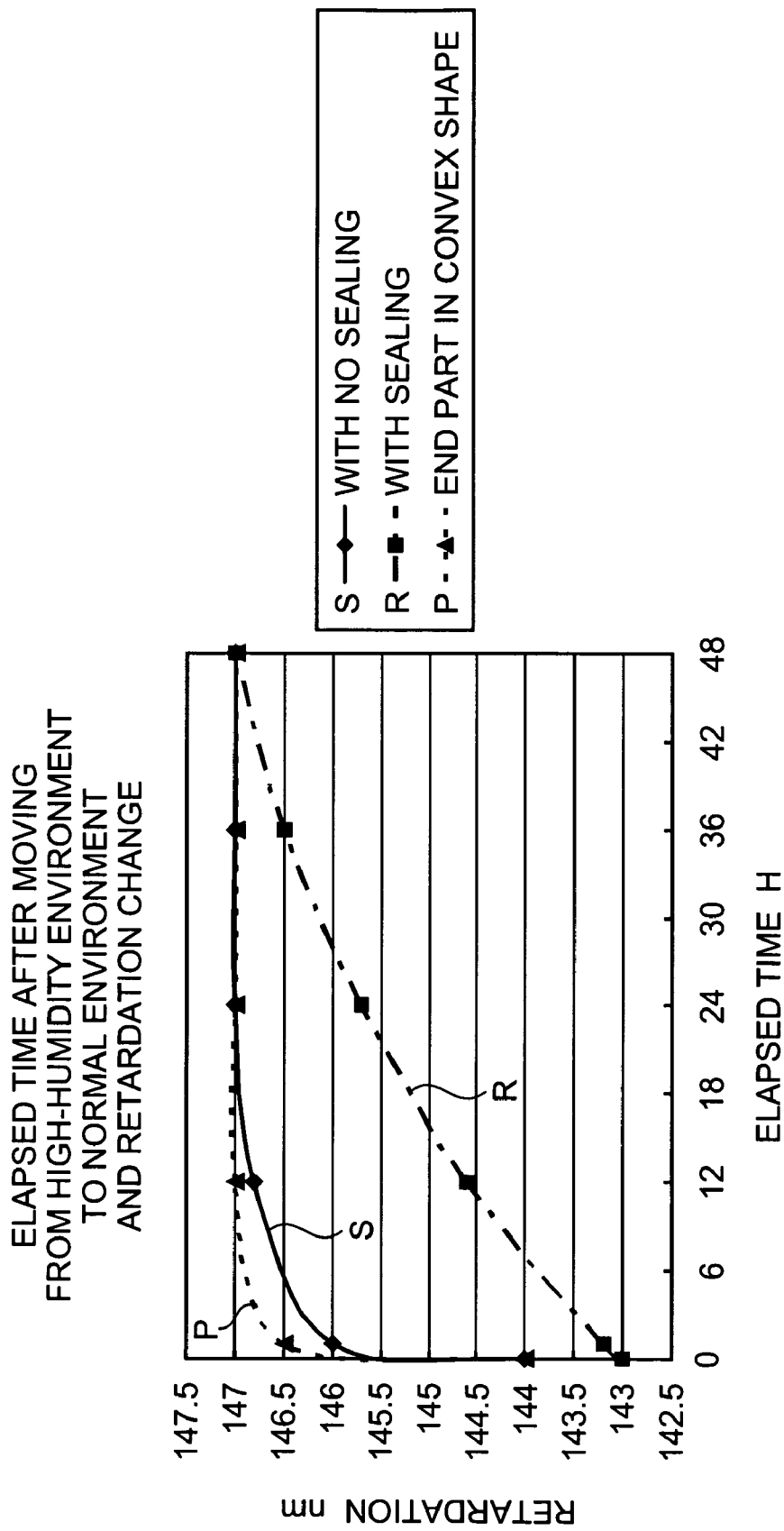
FIG. 10 is a graph showing a relation between elapsed time after moving from the high-humidity environment to the normal environment and a retardation value, depending on a difference in shapes of the end part of the pressure sensitive adhesive.
Figure 11:
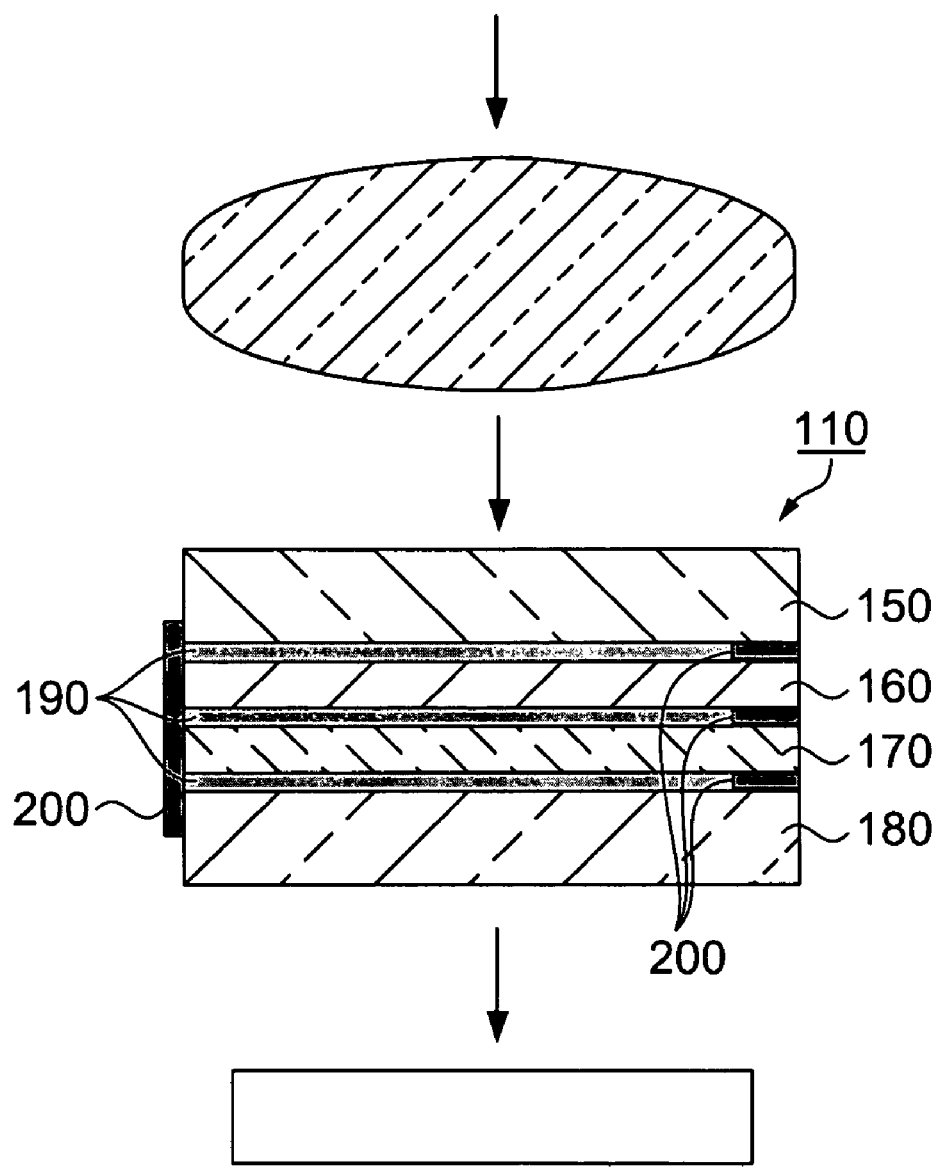
FIG. 11 is a schematic sectional view showing a structure of a related art optical lowpass filter.

11: optical lowpass filter, 12: light, 13: light receiving lens, 14: solid-state imaging element, 15: first birefringent plate as a transmitting optical substrate, 16: IR-cut glass, 17: ¼ retardation film as a transmitting optical film, 18: second birefringent plate as a transmitting optical substrate, 19: pressure sensitive adhesive, 21: solid-state imaging device, 22: package, 23: cover.

The invention claimed is:

1. An optical element, comprising:
   a transmitting optical film;
   a transmitting optical substrate;
   an IR-cut glass disposed between the transmitting optical substrate and the transmitting optical film, and
   a pressure sensitive adhesive, wherein
   the transmitting optical substrate is bonded to the IR-cut glass with the pressure sensitive adhesive,
   the optical element has an ambient air opening structure in which an end part of the pressure sensitive adhesive directly contacts an ambient air,
   the pressure sensitive adhesive is made of a polymer primarily containing at least one monomer selected from acrylic acid alkoxyalkyl ester and methacrylic acid alkoxyalkyl ester, and
   a mixing weight ratio of the polymer is in a range from 60% to 100% inclusive wherein at least one part of the end part of the pressure sensitive adhesive is protruded from a periphery of the transmitting optical substrate.

2. The optical element according to claim 1, further comprising:
   a plurality of transmitting optical substrates, wherein
   at least one of the transmitting optical substrates is any one of crystal, lithium niobate, and calcite.

3. An optical lowpass filter, comprising the optical element according to claim 2.

4. A solid-state imaging device, comprising the optical element according to claim 2.

5. The optical element according to claim 1, further comprising:
   a plurality of transmitting optical substrates,
   wherein at least one of the transmitting optical substrates is any one of an optical glass and an IR absorption glass.

6. An optical lowpass filter, comprising the optical element according to claim 5.

7. A solid-state imaging device, comprising the optical element according to claim 5.

8. The optical element according to claim 1, wherein the transmitting optical film is made of an organic polymer material.

9. An optical lowpass filter, comprising the optical element according to claim 8.

10. A solid-state imaging device, comprising the optical element according to claim 8.

11. An optical lowpass filter, comprising the optical element according to claim 1.

12. A solid-state imaging device, comprising the optical element according to claim 1.

13. The optical element according to claim 1, wherein the pressure sensitive adhesive includes a low molecular weight polymer obtained by copolymerizing at least one monomer selected from methacrylic acid alkyl ester and methacrylic acid cycloalkyl ester and a monomer including an amino group or a monomer including an amide group.

14. The optical element according to claim 13, wherein the low molecular weight polymer has a weight-average molecular weight less than 50,000.

* * * * *